United States Patent
Handa et al.

(10) Patent No.: US 6,391,934 B1
(45) Date of Patent: May 21, 2002

(54) MANUFACTURING FOAMS BY STRESS-INDUCED NUCLEATION

(75) Inventors: Paul Handa, Orleans; Zhiyi Zhang, Vanier, both of (CA)

(73) Assignee: National Research Council of Canada

( * ) Notice: Subject to any disclaimer, the term of this patent is extended or adjusted under 35 U.S.C. 154(b) by 0 days.

(21) Appl. No.: 09/458,983

(22) Filed: Dec. 10, 1999

Related U.S. Application Data (62) Division of application No. 09/161,448, filed on Sep. 28, 1998, now Pat. No. 6,080,798.

(51) Int. Cl.⁷ .................................................. C08J 9/00
(52) U.S. Cl. ......................... 521/149; 521/79; 521/180; 521/181; 264/45.9
(58) Field of Search ......................... 521/79, 149, 180, 521/182; 264/45.9

(56) References Cited

U.S. PATENT DOCUMENTS 3,293,094 A * 12/1966 Narin et al. .................. 156/79
3,293,108 A * 12/1966 Narin et al. .................. 521/73
6,140,379 A * 10/2000 Yang ............................ 521/85

* cited by examiner

Primary Examiner—Morton Foelak
(74) Attorney, Agent, or Firm—J. Wayne Anderson (57) ABSTRACT

The invention disclosed provides a method for inducing nucleation in a polymer by subjecting the polymer containing dissolved gas to an external stress generated, for example, by applying hydrostatic or mechanical pressure. The applied stress restricts the bubble growth so that the foamed materials have small cells and high cell density. Such microcellular foams can be produced over a wide low temperature range, i.e. from the temperature at which the polymer is conditioned with the blowing agent up to about the glass transition temperature of the polymer-blowing agent system. Stress induced nucleation can also be conducted at higher temperatures i.e. up to about the $T_g$ of the neat polymer, leading to foams with larger cells. A variety of homogeneous and heterogeneous foams can be produced by this technique.

3 Claims, 12 Drawing Sheets

Press mold

Roll

MANUFACTURING FOAMS BY STRESS-INDUCED NUCLEATION

At the top of page one, after the title, please enter the heading "Cross-reference to Related Application", followed by a new paragraph "This application is a Divisional of U.S. application Ser. No. 09/161,448, filed Sep. 28, 1998, now U.S. Pat. No. 6,080,798."

FIELD OF THE INVENTION

The invention disclosed provides a method for producing polymeric foams by stress nucleation, and for making new types of heterogeneous foams.

1. Background of the Invention

Microcellular foams have been developed for materials saving and reportedly have attractive mechanical properties. Small cells in the materials, which are normally associated with high cell density, are responsible for such properties. Microcellular foams are stronger than conventional foams which have much bigger cells; thus, providing a potential for a variety of applications.

2. Description of the Prior Art

Various techniques have been developed for producing microcellular foams, including batch processes and continuous processes. These processes are characterized by the following steps: saturating a polymer with a blowing agent, usually a gas; nucleating cells by suddenly reducing the pressure or increasing the temperature of the system; allowing cells to grow up to a certain size and then stopping further growth by rapid cooling. The saturation process in which a gas, driven by concentration gradient, diffuses into the polymer is achieved by exposing the glassy or rubbery polymer to a compressed gas. See, for example, U.S. Pat. No. 4,473,665 issued on Sep. 25, 1984 to Martini-Vvedensky et al.; U.S. Pat. No. 5,223,545 issued on Jun. 29, 1993 to Kumar; U.S. Pat. No. 5,670,102 issued on Sep. 23, 1997 to Perman et al.

Cell nucleation occurs when the gas saturated polymer is in the rubbery state, i.e. when the foaming temperature is higher than the glass transition temperature ($T_g$) of the polymer-gas system. The pressure drop-induced nucleation is achieved by simply releasing the system's pressure while the polymer is in the rubbery state. See Goel and Beckman,[1] and Baldwin et al.[2] The temperature increase-induced nucleation is achieved by heating the gas saturated polymer from its glassy state to a temperature where the system goes into the rubbery state or by heating the gas saturated polymer already in the rubbery state to a higher temperature. See U.S. Pat. No. 4,473,665 issued on Sep. 25, 1984 to Martini-Vvedensky et al. and U.S. Pat. No. 5,334,356 issued on Aug. 2, 1994 to Baldwin et al. The nucleation occurs due to the thermodynamic instability caused by the pressure drop or temperature increase, because the equilibrium gas solubility decreases with decrease in pressure or increase in temperature. Cell growth starts instantaneously after the nucleation step. The common way to restrict or stop the cell growth is to reduce the system's temperature by rapid cooling.

Nucleating agents are usually added to the system to aid nucleation. This approach has proven very successful in producing conventional foams. In the production of microcellular foams, however, nucleating agents are seldom used because the required cell density is quite high and the contribution from nucleating agents to that end is insignificant. Nevertheless, a second phase polymeric material (U.S. Pat. No. 5,369,135 issued on Nov. 29, 1994 to Campbell and Rasmussen) was found to provide nucleation sites to foam a polymer within a certain cell density range, although such a second polymer phase did not show any tendency to facilitate foaming at lower temperatures.

The nucleation step is very important for achieving a desired cell density and cell size. In conventional pressure drop-induced or temperature increase-induced methods, nucleation occurs at quite high temperatures at which cell growth is fast and, thus, difficult to control. In an extrusion process, for instance, cell coalescence due to the uncontrolled cell growth can occur, resulting in poor quality foams. See Behravesh et al.[3]

Nucleating cells by applying stress is a new concept. It has been reported by Lee[4], that application of stress enhances the effect of nucleating agents in the processing of conventional foams though the applied stress itself does not nucleate cells. The present invention, however, provides a method to nucleate cells directly by the application of stress.

Whatever the nucleation method used in a given foaming process, the majority of man-made polymer foams are isotropic (i.e. homogeneous) in structure and, therefore, quite uniform in properties. The reason is that the conventional pressure drop or temperature increase nucleation methods subject the entire polymeric body to thermodynamic instability. Foaming thus tends to develop throughout the polymer giving a regular and uniform cellular structure. On the other hand, natural materials, such as bones, woods, and corks, have anisotropic foam structure. That is, the cellular structure is not uniform or regular throughout the material, or the structure may be regular along one direction but not in another direction. Such a special texture gives natural materials wonderful properties leading to a variety of uses whether as structural materials or as functional materials.

BRIEF SUMMARY OF THE INVENTION

Accordingly, it is an object of this invention to provide a new nucleation process that can be used at low as well as high temperatures and allows for a better control of cell growth.

It is a further object of the present invention to provide a new nucleation method that can be adapted in the existing foaming processes and produce foams which otherwise are difficult or impossible to produce by such processes.

It is another object of this invention to provide a new nucleation technique that can be used to design and produce anisotropic foams, enriching the applications of man made foams.

Thus, a polymer saturated with blowing agent can be stressed e.g. by mechanical or hydrostatic pressure means, at a certain temperature to produce foam. The cell nucleation arises from the thermodynamic instability caused by the stress. Stress can be applied by various ways, of which compression is preferred and is easily achieved e.g. using a press or a rolling system. The compression mechanism can be adopted for both batch and continuous processes. Stress-induced nucleation has short induction time and develops almost instantly throughout the stressed material, giving foams with high cell density, small size cells, and the cellular characteristics can be easily controlled in a prescribed way. The method can be widely used for producing a variety of microcellular foams and can be extended to produce conventional foams.

The polymer to be foamed can be in any desired geometrical shape e.g. a preformed sheet or formed into a sheet by conventional molding techniques. Typically, saturation time will depend upon the polymer-blowing agent combination used and the geometrical characteristics of the polymer. More specifically, there is a finite time, which is required for the polymer to become saturated with the blowing agent, which will vary depending upon the surface area to volume ratio of the polymer.

According to one aspect of the invention a method is provided for producing a closed cell polymer foam, comprising
 (a) selecting a suitable polymer and inert blowing agent combination, wherein the polymer is in a solid or melt state, and the blowing agent is in the form of a gas or a volatile liquid,
 (b) exposing the polymer to the blowing agent at a conditioning temperature, pressure and exposure time, selected according to the thermodynamic properties of the polymer/blowing agent combination to provide a polymer/blowing agent solution having a desired solubility up to a maximum of saturation solubility of the blowing agent in the polymer,
 (c) slowly depressurizing to ambient pressure to prevent premature foam formation,
 (d) applying an external stress to the polymer-blowing agent solution at a temperature at which the polymer was conditioned with the blowing agent up to about the $T_g$ of the neat polymer, wherein the amount of stress applied is dependent upon the thermodynamic properties of the polymer/blowing agent combination and the amount of blowing agent dissolved in the polymer, to form the foam, and
 (e) quenching the foam by rapid cooling to a lower temperature.

Also according to the invention stress nucleation can also be used for manufacturing speciality foams. One of its special applications is in producing anisotropic (i.e. heterogeneous) foams with potential applications as structural and/or functional materials. Such foams provide a good solution for materials saving while delivering the desired properties. For example, a polymer containing dissolved blowing agent can be stressed in selected areas only to produce a heterogeneous material where the selected areas are foamed and the rest are not. A polymer can also be conditioned such that only the surface layer contains the blowing agent and the remainder of the material contains none or only an insignificant amount of the blowing agent. The thickness of the surface layer containing the blowing agent will depend on the conditioning parameters such as exposure time, temperature, and pressure of the blowing agent. The polymer surface can then be stressed to produce a heterogeneous foam where the interior of the polymer is not foamed and only the surface layer or a certain fraction of the surface layer is foamed.

Accordingly, another aspect of the invention involves a solid polymer having a heterogeneous morphology, comprising
 (a) a solid polymer, and
 (b) a modified portion of said polymer, the modification being selected from the group consisting of
  (i) a portion of the polymer being foamed, the remainder of the polymer left unfoamed, and,
  (ii) a portion of the polymer being foamed to a certain degree, the remainder of the polymer being foamed to a different degree.

DESCRIPTION OF THE PREFERRED EMBODIMENTS

A polymer is conditioned with a blowing agent, usually a gas such as carbon dioxide, to achieve a desired solubility of the blowing agent in the polymer. The maximum desired solubility attainable is the saturation or equilibrium solubility. The minimum desired solubility depends upon the nature of the product being made. The equilibration can be conducted with polymer in the glassy (i.e. solid) or the rubbery state. When in the glassy-state, for example, the polymer can be housed in a chamber and exposed to the blowing agent under certain pressure and temperature for a certain time period. The applied pressure, temperature, and the exposure time are selected according to the thermodynamic properties of the polymer-blowing agent system, in order to achieve a desired solubility of the blowing agent in the polymer.

When in the rubbery state, the polymer can be mixed with the blowing agent e.g. in an extruder. In order to achieve the desired solubility, the pressure in the extruder should be kept at a rather high value. A cold die arrangement could be then applied to cool the polymer-blowing agent system down to a temperature such that foaming will not occur when the polymer exits the die. For example, a cold die arrangement such as the one described in U.S. Pat. No. 4,761,256 issued on Aug. 2, 1988 to Hardenbrook et al., the disclosure of which is incorporated herein by reference, can be used.

An external stress is then applied to the polymer/blowing agent solution to nucleate cells and initiate cell growth. Typically, to produce homogeneous or heterogeneous microcellular foams, this step is conducted at a temperature from the temperature at which the polymer is conditioned with the blowing agent up to about the glass transition temperature ($T_g$) of the polymer-blowing agent system e.g. at room temperature, so that the cell growth can be easily controlled. For producing conventional larger cell foams i.e. foams having cell sizes larger than 100 micrometers, this step can be conducted at higher temperatures, up to about the $T_g$ of the neat polymer. The amount of stress applied depends on the thermodynamic properties of the polymer/blowing agent combination, the temperature, and the blowing agent content of the polymer. Accordingly, there is an optimum stress range for a certain polymer-blowing agent combination, temperature, and blowing agent content. For example, the optimum stress for nucleation is in the range of 130 to 270 atm for PMMA containing 22.4 wt % $CO_2$ at room temperature. Generally, the higher the solubility, the lower the stress required for nucleation.

Compressive stress can be applied by squeezing the sample in between the platens of a press or by a compressive rolling system, depending on whether the process is discontinuous or continuous.

Figure 1:
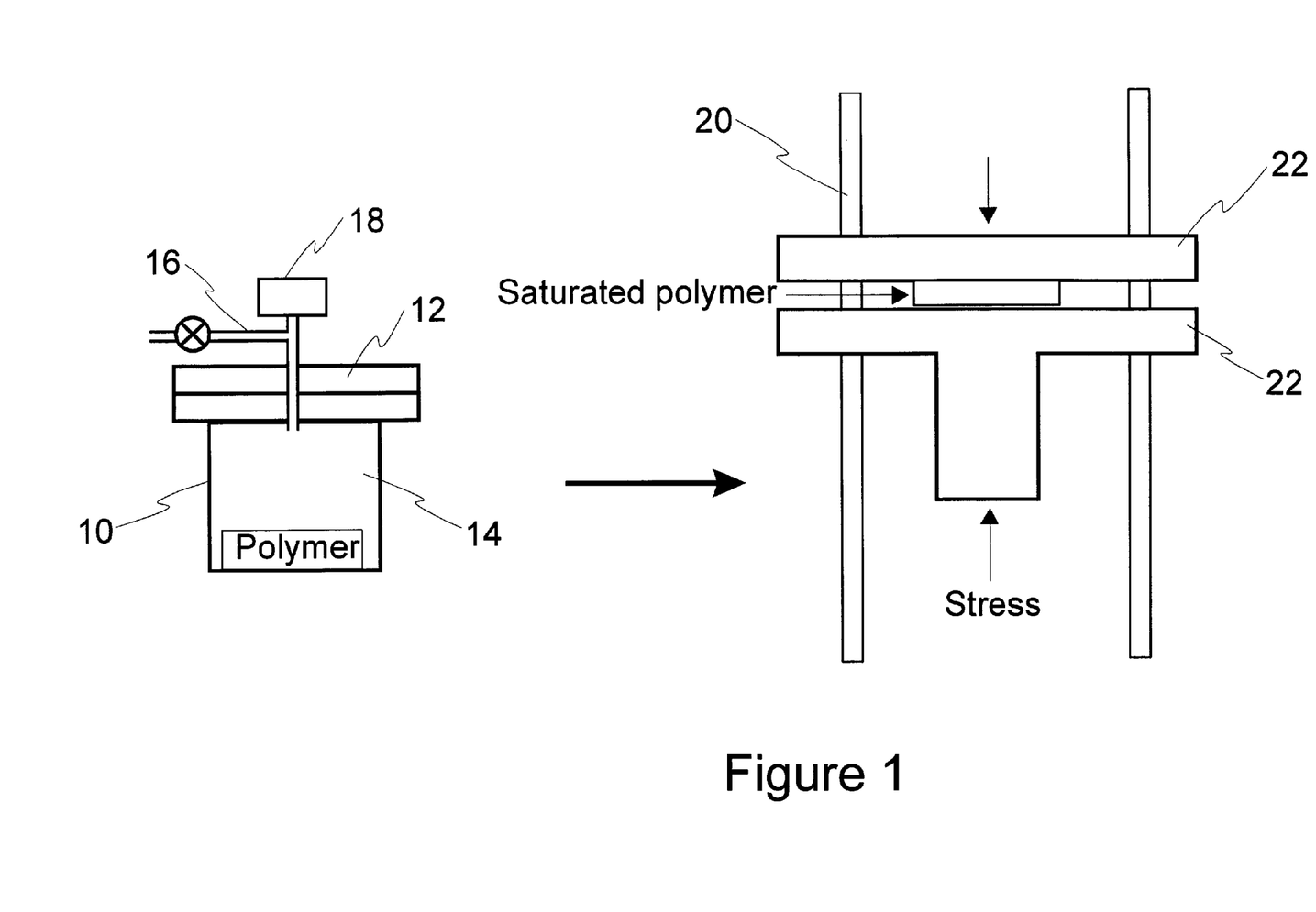
FIG. 1 is a schematic side elevation in section of a batch process according to our invention.

For a discontinuous process, such as the batch process illustrated in FIG. 1, an apparatus used according to the invention includes an open topped pressure vessel 10, having a lid 12 and an internal chamber 14. The lid includes an inlet 16, connected to a supply of blowing agent. A pressure gauge 18 is connected to the inlet to measure the pressure in the chamber 14. Once the polymer achieves the desired level of solubility of the blowing agent, the pressure is slowly released to prevent premature foam formation. The polymer containing dissolved blowing agent is then transferred to the compression press 20 and located between the platens 22 and squeezed at a certain temperature to induce foaming.

A suitable continuous process could be an extrusion-based one with the cold-die arrangement as cited earlier or a semi-continuous one as disclosed in U.S. Pat. No. 5,684,055 issued on Nov. 4, 1997 to Kumar and Schirmer, the disclosure of which is incorporated herein by reference. The polymer-blowing agent solution on exit from the extruder is cooled to a temperature at which foaming does not occur. It is then guided through a system of rollers for compression at a certain temperature.

In the semi-continuous process mentioned above, but not illustrated, a spool of perforated-paper backed polymer sheet is saturated with a blowing agent and then the sheet from the spool is fed into hot water for foaming. In the semi-continuous process proposed here, the sheet from the blowing agent saturated spool is fed through a system of rollers which impart compressive stress to the polymer.

Nucleation induced by stress can be completed within one second to a few seconds. After the nucleation, cells are allowed to grow for a short time before cooling rapidly to arrest the cell growth and, thus, lock-in the cell size. During the cell growth stage, the polymer can be kept under the external stress which restricts cell growth to give foams with smaller cells and high cell density or the polymer can be freed of the stress to allow unconstrained foaming i.e. larger cell sizes and lower cell density. During the cell growth stage, stress can also be applied to shape the polymer into a desired form. Such a shaping process can be achieved by controlling the residence time in the press, or by changing the roll number or rotation speed for the rolling system. Optimum residence time depends on the thermodynamic properties of the polymer-blowing agent system, solubility of the blowing agent in the polymer, and the stress applied.

Figure 3:
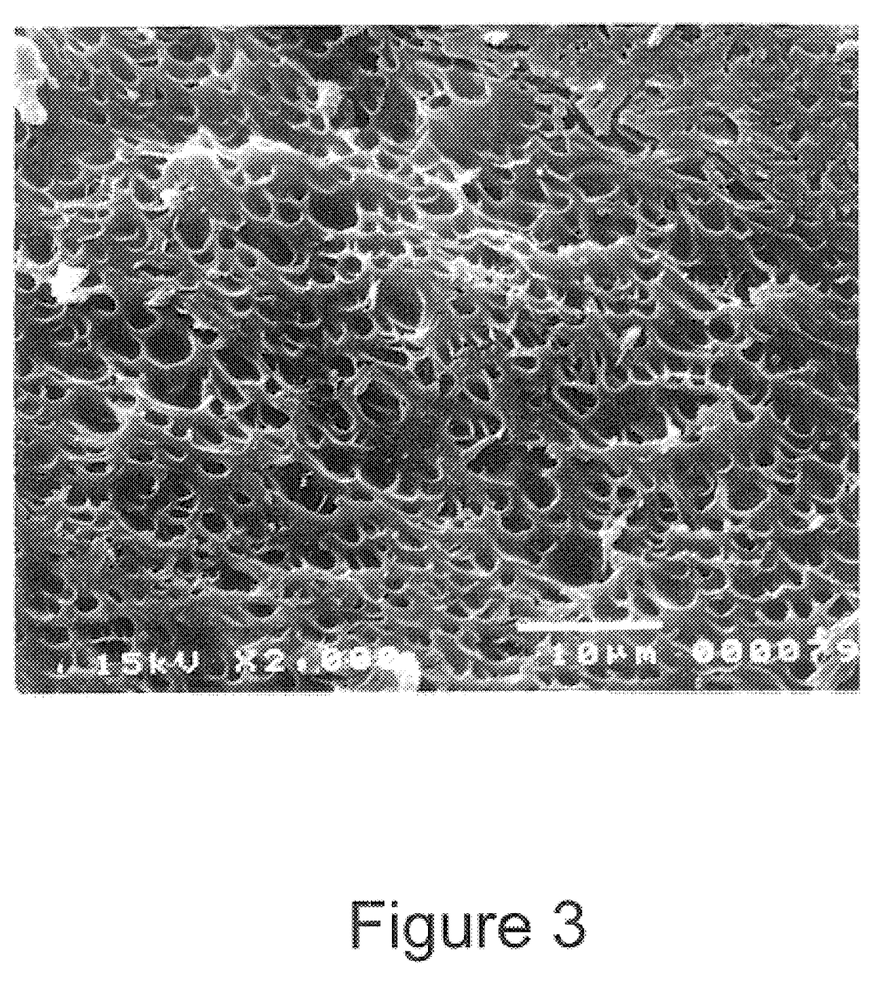
FIGS. 3 and 4 show the scanning electron microscope (SEM) microphotographs of PMMA foams made by stress-induced nucleation, and by temperature increase-induced nucleation, respectively.
Figure 4:
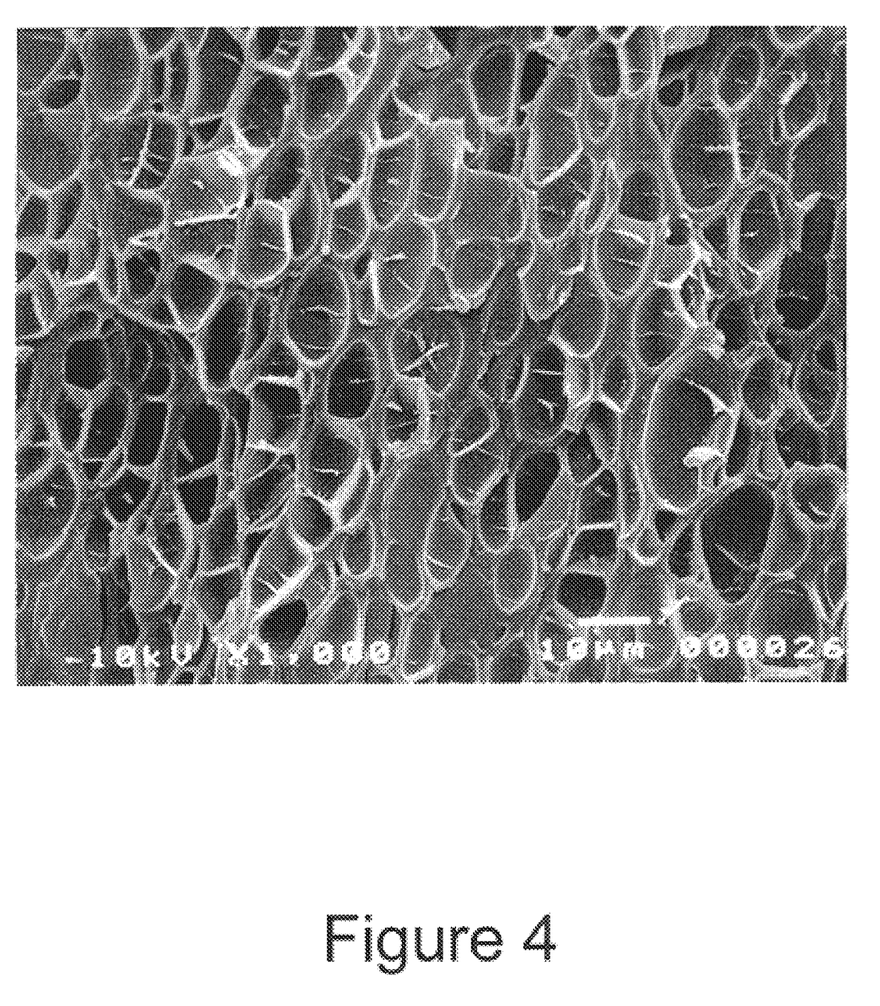

A major advantage of such a technique is that stress-induced nucleation occurs very fast throughout the stressed material. As a result, foams with very high density and small cells can be produced as shown in FIGS. 3 and 4. Secondly, the induction time for stress-induced nucleation is shorter than that for conventional pressure drop-induced or temperature increase-induced nucleation under the same conditions. Furthermore, stress nucleation can occur at a temperature at which nucleation by pressure drop or temperature increase methods is not possible. Consequently, foaming, nucleated by stress, can be carried out at quite low a temperature, such as room temperature, at which the polymer viscosity is quite high which makes it possible to control cell growth very easily.

Although stress nucleation is described here for producing microcellular foams using various processes, it will be appreciated by those skilled in the art that the novel method can also be used for producing conventional larger cell foams. In addition, such a technique can be used to produce specialty foams e.g. anisotropic or heterogeneous foams.

Figure 10:
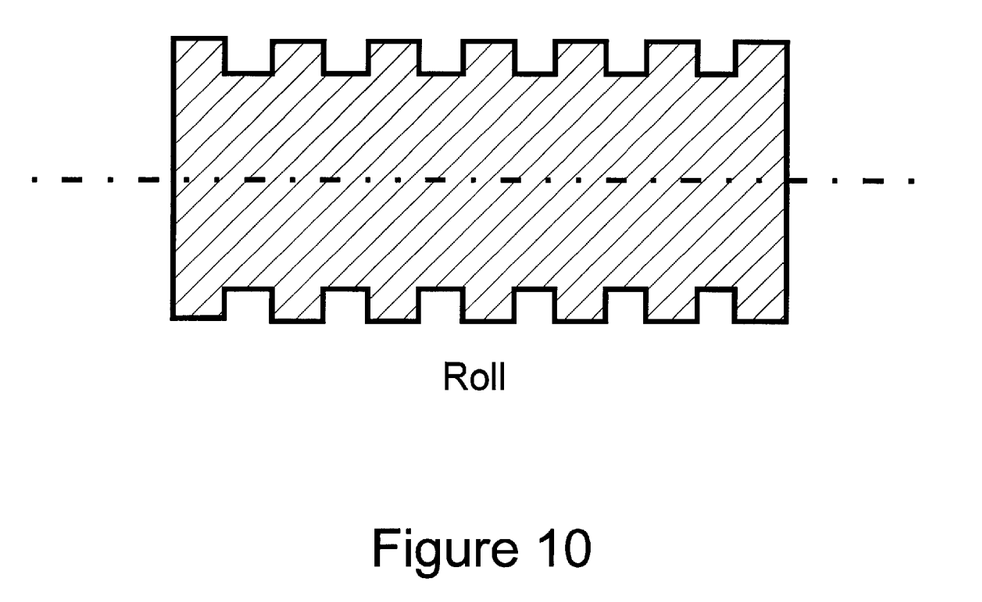
FIG. 10 is a schematic side elevation in section of the roll that could be used to produce rib foams according to our invention.

Stress nucleation can be used to produce custom designed anisotropic foams because stress can be applied on selected regions or areas of the polymer containing dissolved gas. Since stress nucleation has a shorter induction time and nucleation can be achieved at a lower temperature, a processing temperature can be selected so that only the stressed part will be foamed within a certain period of time while the unstressed parts remain unfoamed, or the stressed parts are foamed with high cell density and small cell size while the unstressed parts are foamed with lower cell density and larger cell size, depending on the selected temperature and the processing time scale. Thus, with this method, the anisotropic structure can be designed by simply designing the way in which stress is applied. The most convenient way is to compress the polymer system with a template, such as a press mold or a rolling system, which has a certain pattern e.g. as in FIGS. 8, 10 and 11. The prescribed pattern is then transferred to the polymer-blowing agent system leading to foaming of the polymeric material to match the pattern.

Figure 9:
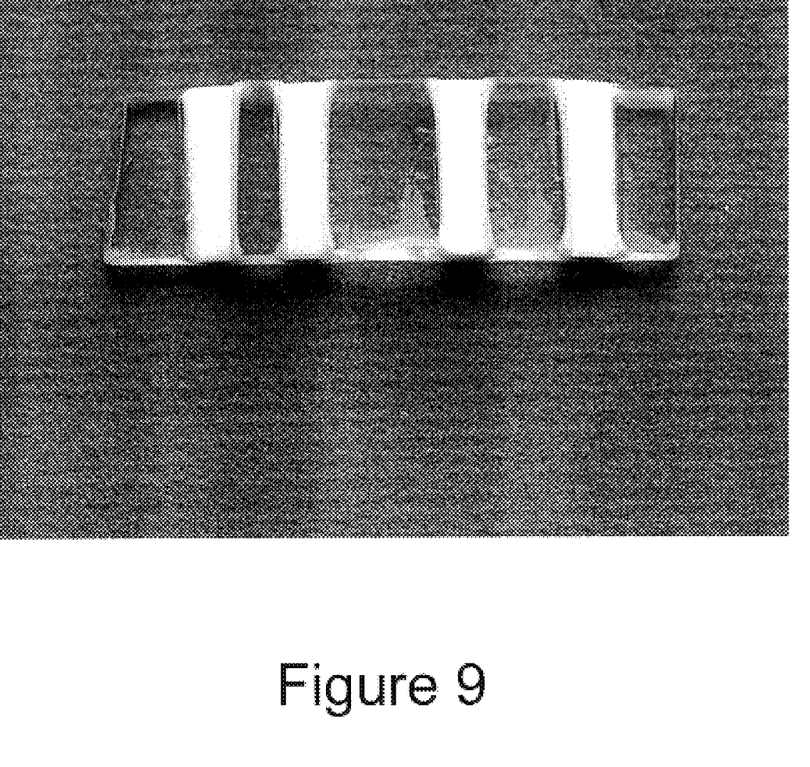
FIG. 9 is a photograph of PMMA rib foams, made by stress-induced nucleation.
Figure 12:
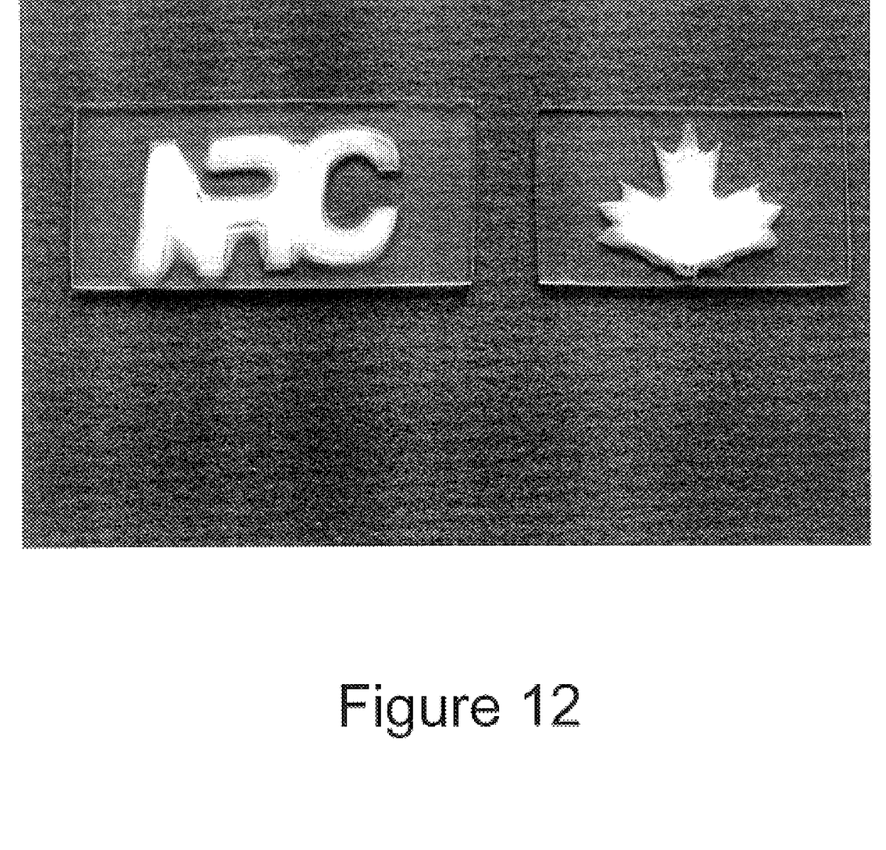
FIG. 12 is a photograph of PMMA image foams made by stress-induced nucleation.

Anisotropic foams can be produced for structural applications. For example, the present invention was used to produce rib foams, as shown in FIG. 9. Such materials will have advantage over the neat polymer along the rib direction when the ribs are dense enough. Anisotropic foams are known to be a practical solution to materials saving while maintaining the desired properties. This is demonstrated by naturally occurring foams such as various woods which are lightweight but have attractive load bearing properties. Anisotropic foams can be produced for functional applications as well. For example, image foams (as shown in FIG. 12) can be used for decoration or other purposes.

EXAMPLE 1

PMMA sheets, 2.72 mm thick, obtained from Canus Plastics were placed in a pressure vessel made up of stainless steel VCR fittings and exposed to $CO_2$ under 34 atm at $-0.2°$ C. for 24 hours. The solubility of $CO_2$ in the polymer was measured to be 22.4 wt %. After depressurizing slowly, the vessel was opened and the polymer sheets containing dissolved $CO_2$ taken out. A portion of the sheet was then compressed at various pressures from 20 atm to 350 atm in the press, as shown in FIG. 1, at room temperature, although the actual temperature of the polymer was somewhere between the conditioning temperature of $-0.2°$ C. and room temperature. When the applied stress was in the range 130 to 270 atm, nucleation, followed by foaming, occurred within one to a few seconds throughout the stressed portion while the unstressed portion remained unfoamed for 1.5 min.

Figure 2:
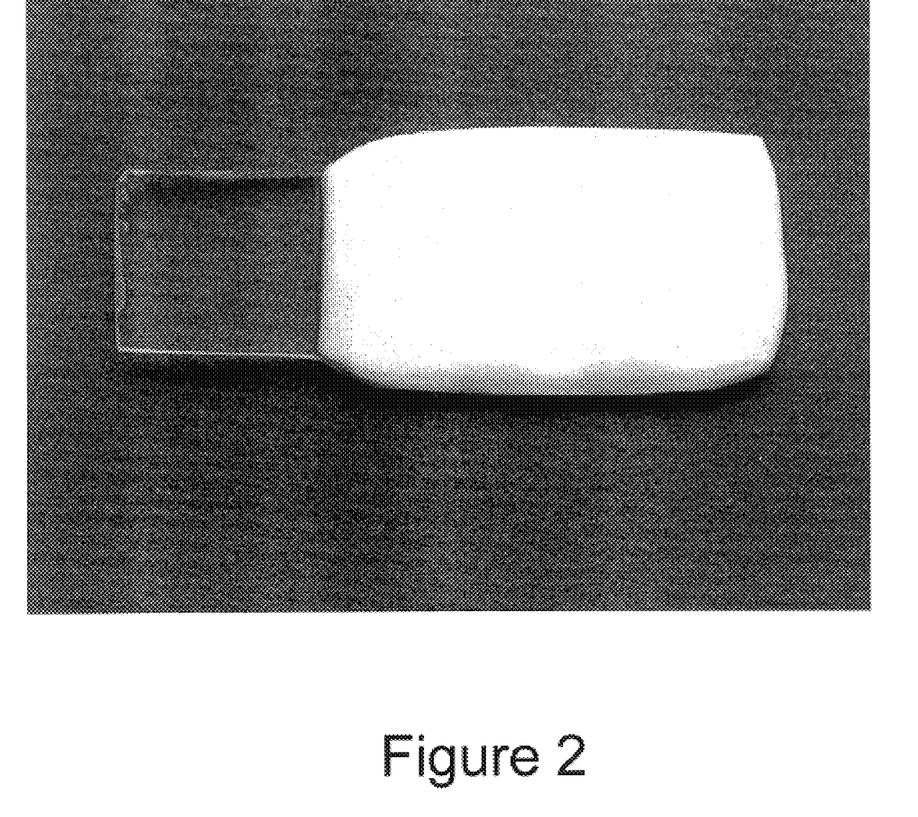
FIG. 2 is a photograph of partially foamed poly(methyl methacrylate) (PMMA) obtained by applying a stress of 220 atm for 30 seconds at room temperature to a $CO_2$-saturated sample.

FIG. 2 shows a typical photograph of the partially stressed PMMA after it was compressed at 220 atm for 30 seconds and then quenched in ice cold water. FIGS. 3 and 4 show a comparison of the SEM microphotographs of microcellular foams produced according to the invention by a stress of 220 atm in a press at 24° C. for 30 seconds (FIG. 3) and by the conventional temperature increase-induced nucleation by transferring the gas-laden sample to a water bath kept at 24° C. and letting it foam for 10 minutes (FIG. 4). The nucleation in the water bath was observed to occur more than one minute later than the stress-induced nucleation. The cell density and average cell size, respectively, are $1.5 \times 10^{11}$ cells/g and 2.9 µm for the stress-nucleated foams and $4.4 \times 10^9$ cells/g and 4.8 µm for the temperature increase-nucleated ones.

EXAMPLE 2

Figure 5:
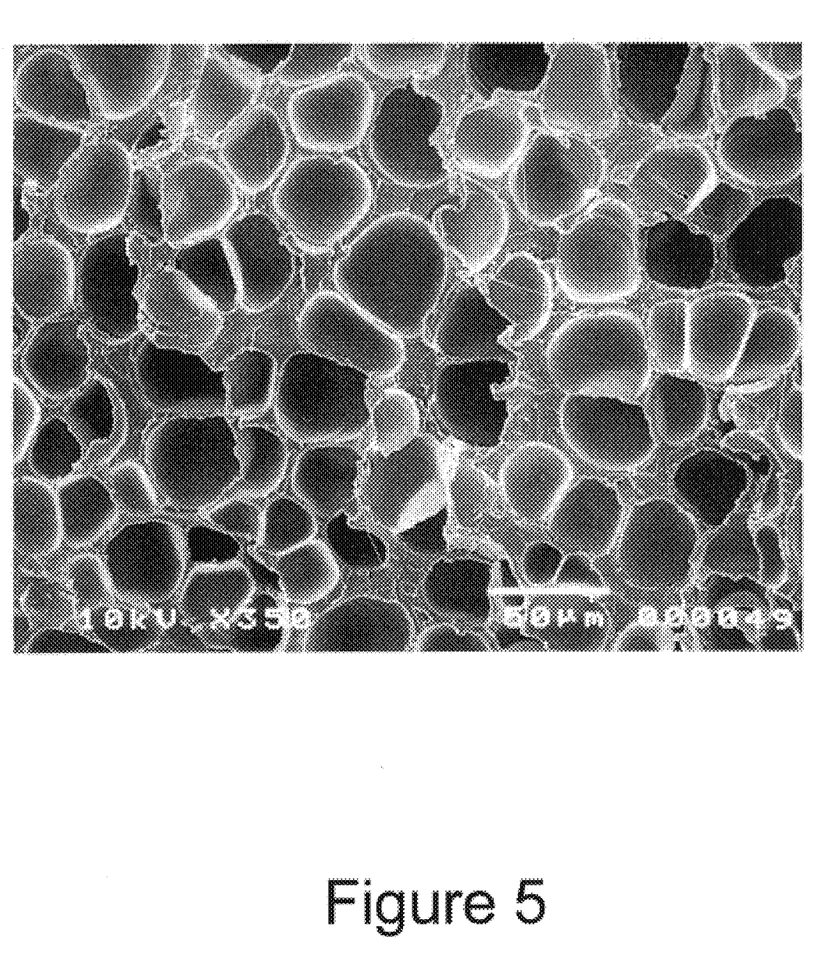
FIGS. 5 and 6 show the SEM microphotographs of glycol modified poly(ethylene terephthalate) (PETG) foams made by stress-induced nucleation, and by pressure drop-induced nucleation, respectively.
Figure 6:
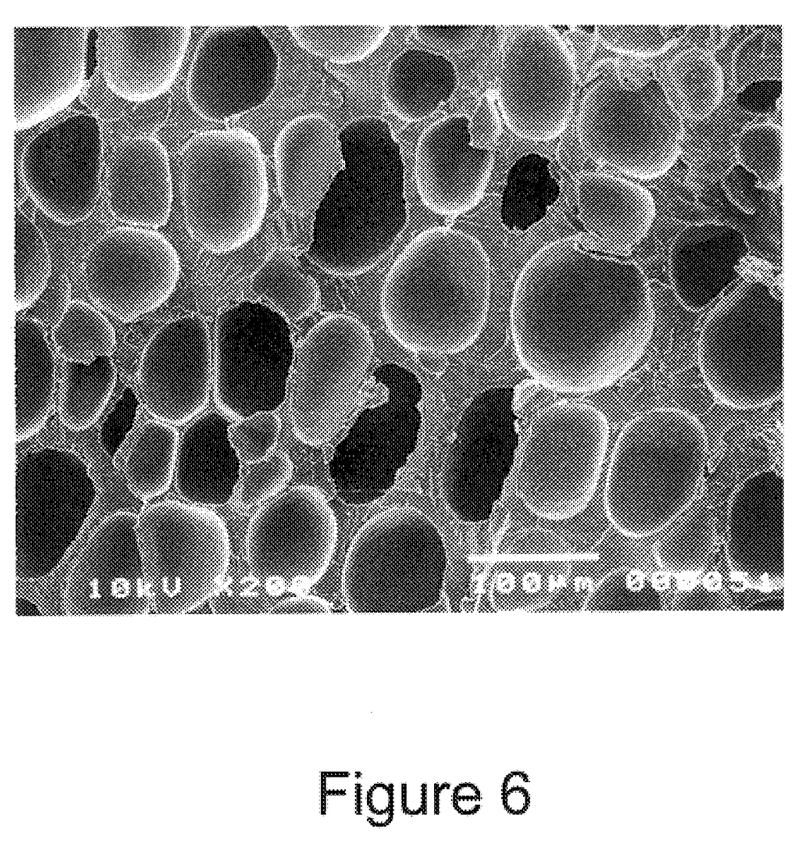

PETG films, 0.76 mm thick, were placed in the pressure vessel described in Example 1, and exposed to 58 atm $CO_2$ at 24° C. for 24 hr. The solubility of $CO_2$ in PETG was measured to be 12 wt %. After the pressure was slowly released, the films were taken out of the pressure vessel and compressed in the press described in Example 1 at 24° C. for 30 seconds within a pressure range of 220 to 320 atm and then quenched in ice cold water. Nucleation occurred instantly when the films were stressed. Nucleation arising from the conventional pressure drop method, also occurred for unstressed sheets but at a later time. A comparison of the results is shown in FIGS. 5 and 6. FIG. 5 shows a typical SEM microphotograph of stress-nucleated PETG foam, and FIG. 6 shows the conventional pressure drop-nucleated foam. The cell density and cell size, respectively, are $4.7 \times 10^7$ cells/g and 23.6 µm for the stress-nucleated foam, and $2.9 \times 10^6$ cells/g and 61.3 µm for the conventional pressure-drop one.

EXAMPLE 3

Figure 7:
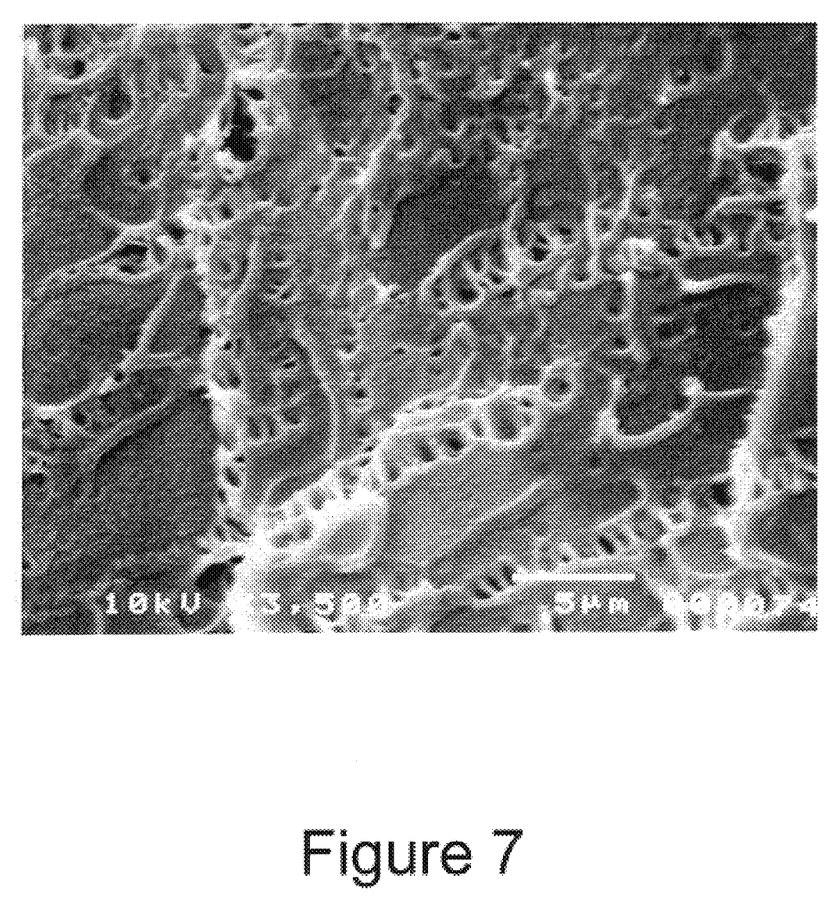
FIG. 7 is the SEM microphotograph of polycarbonate foam made by stress-induced nucleation.

Polycarbonate from GE was compression molded as 1.24 mm thick sheets, placed in the pressure vessel described in Example 1, and exposed to 58 atm $CO_2$ at 24° C. for 48 hr. The solubility of $CO_2$ in polycarbonate was measured to be 6 wt %. After the pressure was slowly released, the sheets were taken out of the pressure vessel and some of the sheets were compressed in the press described in Example 1 at 24° C. for 30 seconds under a pressure of 320 atm and then quenched in ice cold water. Nucleation occurred almost instantly when the sheets were stressed, while nothing happened to the unstressed sheets. FIG. 7 shows the SEM microphotograph of stress-nucleated and foamed polycarbonate.

EXAMPLE 4

Figure 8:
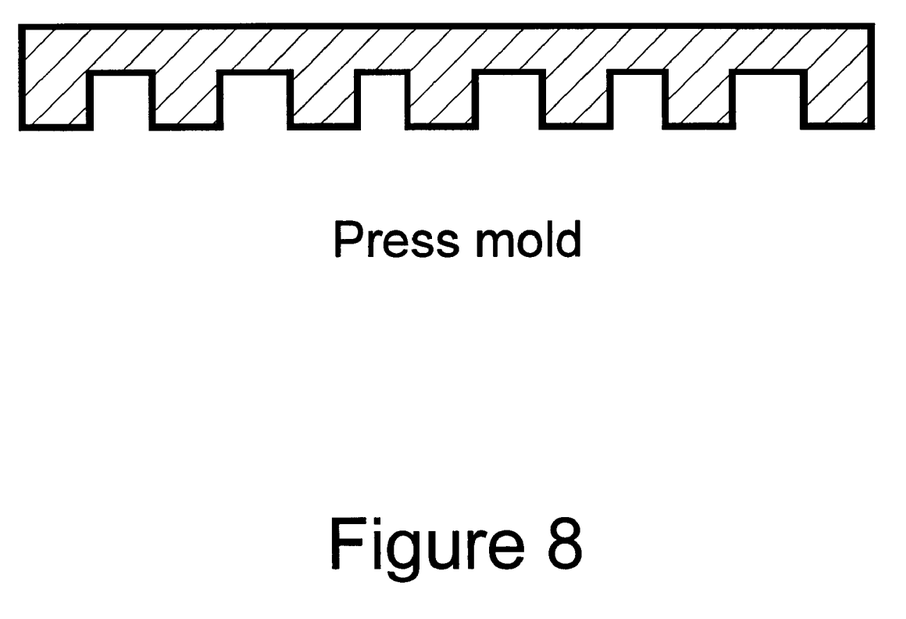
FIG. 8 is a schematic side elevation in section of the mold used to produce rib foam shown in FIG. 9.

PMMA sheets, 2.72 mm thick, were exposed to $CO_2$ under the same conditions as in EXAMPLE 1. The saturated polymer was pressed at 24° C. using a mold with a surface pattern as shown in FIG. 8, and FIG. 9 shows the resulting rib foam.

EXAMPLE 5

Figure 11:
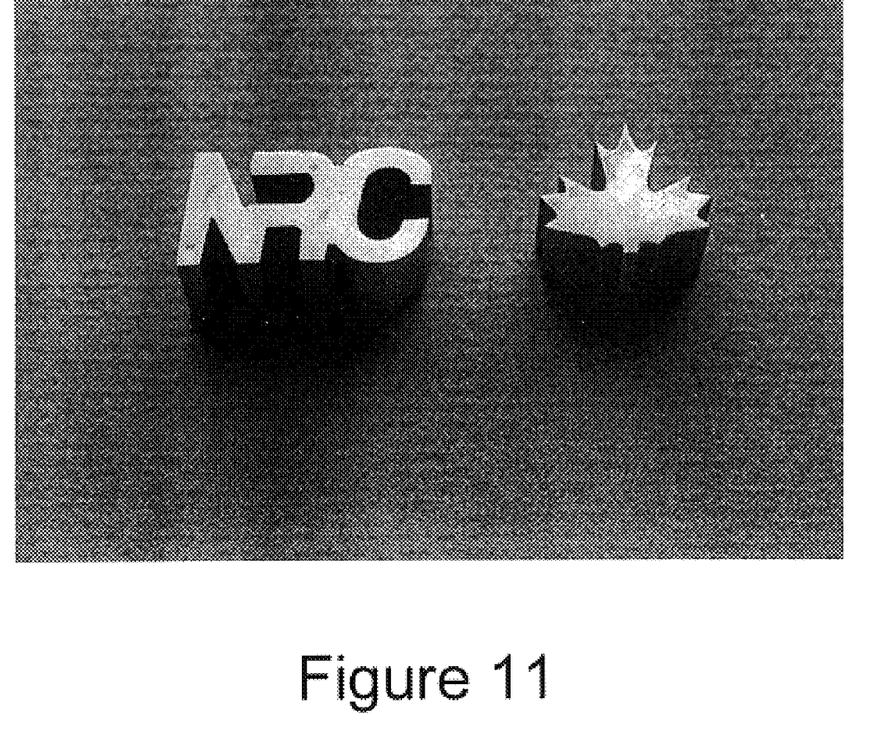
FIG. 11 is a photograph of the molds used to produce image foams shown in FIG. 12.

PMMA sheets, 1.22 mm thick, were exposed to $CO_2$ under the same conditions as in EXAMPLE 1. The saturated polymer was pressed at 24° C. with the molds having the surface patterns as shown in FIG. 11. FIG. 12 shows the resulting image foams.

EXAMPLE 6

PMMA sheets, 1.22 mm thick, were exposed to $CO_2$ under the same conditions as in EXAMPLE 1 except that the exposure time was limited to 4 hours instead of 24 hours, to condition only the surface layer of the polymer. After depressurizing slowly, the polymer sheets containing dissolved blowing agent in the surface layers only were taken out of the pressure vessel and compressed at 220 atm for 30 seconds in the manner described in EXAMPLE 1. This produced polymer sheets with foamed skin and unfoamed core.

Although the invention has been described in terms of specific polymer/blowing agent combinations, it will be appreciated by those skilled in the art that it is applicable to any such combination in which nucleation is induced when a polymer/blowing agent solution is exposed to an external stress at a predetermined temperature, wherein the amount of the applied stress is dependent upon the thermodynamic properties of the polymer/blowing agent combination and the amount of blowing agent dissolved in the polymer.

Moreover, any amorphous or semi-crystalline thermoplastic polymer can be used. Examples include PMMA, PEMA, polystyrene, polyvinylchloride (PVC), polycarbonate, ABS copolymers, and polyethyleneterephthalate (PET).

For the blowing agent, any inert compound which does not react with the polymer and which is reasonably soluble in the polymer such that it will induces nucleation in the polymer under the process conditions described above, may be used e.g. Ar, $N_2$, $SF_6$, $CO_2$, ethylene, and ethane. $CO_2$ is preferred, since it is non-toxic, non-flammable, environmentally acceptable, and inexpensive. It is also advantageous that $CO_2$ is relatively highly soluble in many thermoplastic polymers such as PMMA and PEMA.

It will also be appreciated that other changes and modifications can be carried out without departing from the scope of the invention which is intended to be limited only by the scope of the appended claims.

REFERENCES CITED

1. Goel and Beckman, Polymer Engineering and Science, 34 (1994) 1137–1147.
2. Baldwin et al., Polymer Engineering and Science, 36 (1996) 1425–1435.
3. Behravesh et al., Polymer Preprints, 37 (1996) 767–768.
4. Lee, Polymer Engineering and Science, 33 (1993) 418–422.

We claim:

1. A solid polymer having a heterogeneous morphology, comprising
    (a) a solid polymer, and
    (b) a modified portion of said polymer, the modified portion being in a surface layer of the polymer, wherein a portion of the surface layer of the polymer is foamed to a certain degree, and the rest of the surface layer of the polymer is foamed to a different degree.

2. A polymer according to claim 1, wherein the polymer is selected from the group consisting of thermoplastic amorphous polymers and thermoplastic semi-crystalline polymers.

3. A polymer according to claim 1, wherein the polymer is selected from the group consisting of PMMA, PETG and polycarbonate.

* * * * *